United States Patent
Kang et al.

(10) Patent No.: US 7,539,424 B2
(45) Date of Patent: May 26, 2009

(54) BURST MODE OPTICAL RECEIVER FOR MAINTAINING CONSTANT SIGNAL AMPLITUDE

(75) Inventors: Ho Yong Kang, Daejeon (KR); Hyun Kyun Choi, Daejeon (KR); Tae Whan Yoo, Daejeon (KR); Hyeong Ho Lee, Daejeon (KR); Sang Gug Lee, Daejeon (KR); Man Seop Lee, Daejeon (KR); Ja Won Seo, Goyang (KR)

(73) Assignees: Electronics and Telecommunications Research Institute, Daejeon (KR); Information and Communications University, Daejeon (KR)

( * ) Notice: Subject to any disclaimer, the term of this patent is extended or adjusted under 35 U.S.C. 154(b) by 552 days.

(21) Appl. No.: 10/696,142

(22) Filed: Oct. 28, 2003

(65) Prior Publication Data
US 2004/0190912 A1    Sep. 30, 2004

(30) Foreign Application Priority Data
Mar. 29, 2003    (KR) .................. 10-2003-0019824

(51) Int. Cl.
    *H04B 10/06*    (2006.01)
(52) U.S. Cl. .................................... 398/208; 398/209
(58) Field of Classification Search ............... 330/252, 330/254, 260, 261, 278; 398/208–209
    See application file for complete search history.

(56) References Cited

U.S. PATENT DOCUMENTS

| 4,565,974 | A | * | 1/1986 | Smoot .................. 330/304 |
| 5,430,765 | A | * | 7/1995 | Nagahori .............. 375/318 |
| 5,442,321 | A | * | 8/1995 | Bayruns et al. ........ 330/282 |
| 5,475,342 | A | | 12/1995 | Nakamura et al. |
| 5,955,921 | A | | 9/1999 | Ide et al. |
| 6,911,644 | B2 | * | 6/2005 | Doh et al. ............. 250/214 AG |

FOREIGN PATENT DOCUMENTS

FR    2532802    *    3/1984

OTHER PUBLICATIONS

Computer generated English translation of document FR2532802.*

* cited by examiner

*Primary Examiner*—Leslie Pascal
(74) *Attorney, Agent, or Firm*—Blakely, Sokoloff, Taylor & Zafman LLP

(57) ABSTRACT

Provided is a burst mode optical receiver capable of accurately detecting an optical signal of minimum amplitude, by automatically controlling a gain of a pre-amplifier according to an amplitude of an input optical signal. The burst mode optical receiver can automatically control a gain of a pre-amplifier according to the amplitude of an input optical signal using an output signal of a first peak detector. In other words, when the input optical signal has a small amplitude that meets the receiving sensitivity of the burst mode optical receiver, the gain of the pre-amplifier automatically increases, thereby improving the receiving sensitivity of the burst mode optical receiver.

3 Claims, 6 Drawing Sheets

US 7,539,424 B2

BURST MODE OPTICAL RECEIVER FOR MAINTAINING CONSTANT SIGNAL AMPLITUDE

CROSS REFERENCE TO RELATED APPLICATION

This application claims the priority of Korean Patent Application No. 2003-19824, filed on 29 Mar. 2003, in the Korean Intellectual Property Office, the disclosure of which is hereby incorporated by reference in its entirety.

BACKGROUND OF THE INVENTION

1. Field of the Invention

The present invention relates to a burst mode optical receiver, and more particularly, to a burst mode optical receiver which improves receiving sensitivity by automatically controlling gain of a pre-amplifier.

2. Description of the Related Art

FIG. 1 illustrates a passive optical network (PON) using a conventional burst mode receiver (not shown). In the PON, TDMA (time division multiple access) is used for multipoint access in order to reduce cost. In TDMA, each user packet is multiplexed in a time sequence as burst data at an optical line termination (OLT) 30 which receives optical packets from a plurality of optical network units (ONUs) 10a-10d via a passive optical splitter. Splitting of optical signals is caused by difference among distances between the OLT 30 and the ONUs 10a-10d. The conventional burst mode receiver in the OLCT 30 receives optical packets with different signal amplitudes, i.e., optical packets with burst characteristics due to splitting of the optical signals. As such, the conventional burst mode receiver must be able to handle these burst packets.

FIG. 2 is a block diagram of a conventional burst mode optical receiver in the form of a feed-forward scheme (refer to U.S. Pat. No. 5,475,342). Referring to FIG. 2, an output signal INPUT of a pre-amplifier (not shown) is used as inputs for a limiting amplifier 70, a top peak detector 50, and a bottom peak detector 60. A reference voltage Vref, which is set based on the top peak detector 50 and the bottom peak detector 60, is used as another input for the limiting amplifier 70. When the burst mode optical receiver receives a burst signal of small amplitude which meets the receiving sensitivity of the receiver, it is difficult for the top peak detector 50 and the bottom peak detector 60 to accurately detect a top peak voltage and a bottom peak voltage. As a result, the reference voltage Vref, an average value of the top peak voltage and the bottom peak voltage, cannot be accurately set, which increases the probability of pulse width distortion in a final output of the limiting amplifier 70.

FIG. 3 is a block diagram of a conventional burst mode optical receiver in the form of a feed-back scheme (refer to U.S. Pat. No. 6,055,279). In the conventional burst mode optical receiver of FIG. 3, outputs of a main pre-amplifier 100 and a tracking pre-amplifier 110 are respectively input to an OP-AMP 120, and an output of OP-AMP 120 is fed back to OP-AMP 120 via an automatic threshold controller (ATC) 130. The conventional burst mode optical receiver of FIG. 3 does not compensate for a burst signal of small amplitude which meets the receiving sensitivity of the receiver, which increases the probability of pulse width distortion when the burst signal of small amplitude is detected.

SUMMARY OF THE INVENTION

The present invention provides a burst mode optical receiver capable of accurately detecting an optical signal of small amplitude which meets the sensitivity of the receiver, by automatically controlling a gain of a pre-amplifier according to the amplitude of an input optical signal.

According to one aspect of the present invention, there is provided a bust mode optical receiver. The bust mode optical receiver includes a photodiode, a pre-amplifier, a first peak detector, a gain controller, a first limiting amplifier, and a buffer. The photodiode receives an optical signal and converts the optical signal into a current signal. The pre-amplifier converts the current signal into a voltage signal, amplifies the voltage signal with a gain according to a control signal, and outputs an amplified signal. The first peak detector detects a top peak voltage and a bottom peak voltage of the amplified signal and outputs an average value of the detected top peak voltage and the detected bottom peak voltage as a first reference voltage. The gain controller compares the first reference voltage with a comparison voltage and outputs the control signal which controls a gain of the pre-amplifier according to the comparison result. The first limiting amplifier receives the amplified signal and the first reference voltage and amplifies a difference between the amplified signal and the first reference voltage. The buffer buffers an limitedly amplified signal from the first limiting amplifier.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which preferred embodiments of the invention are shown.

Figure 1:
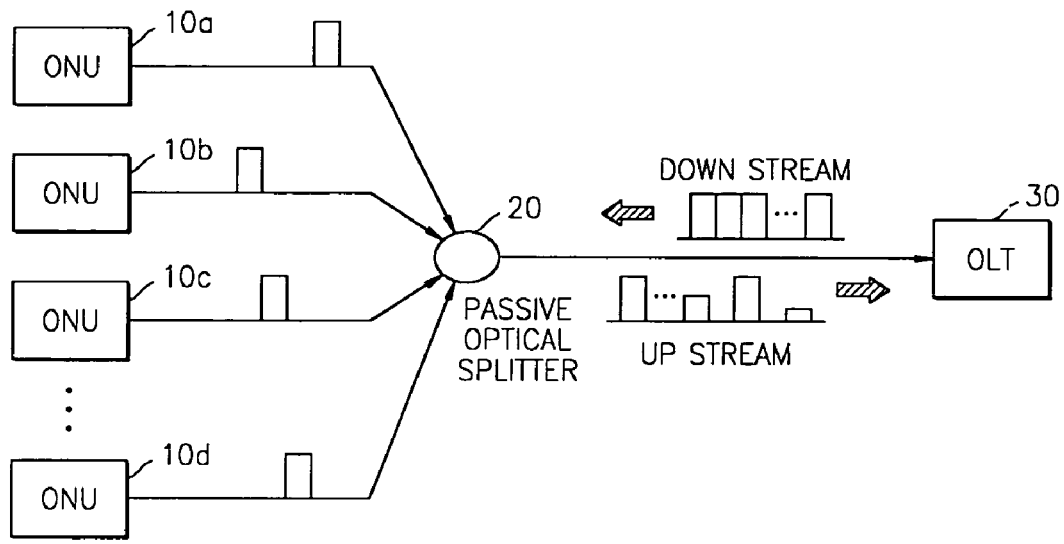
FIG. 1 illustrates a passive optical network (PON) using a general burst mode receiver.
Figure 2:
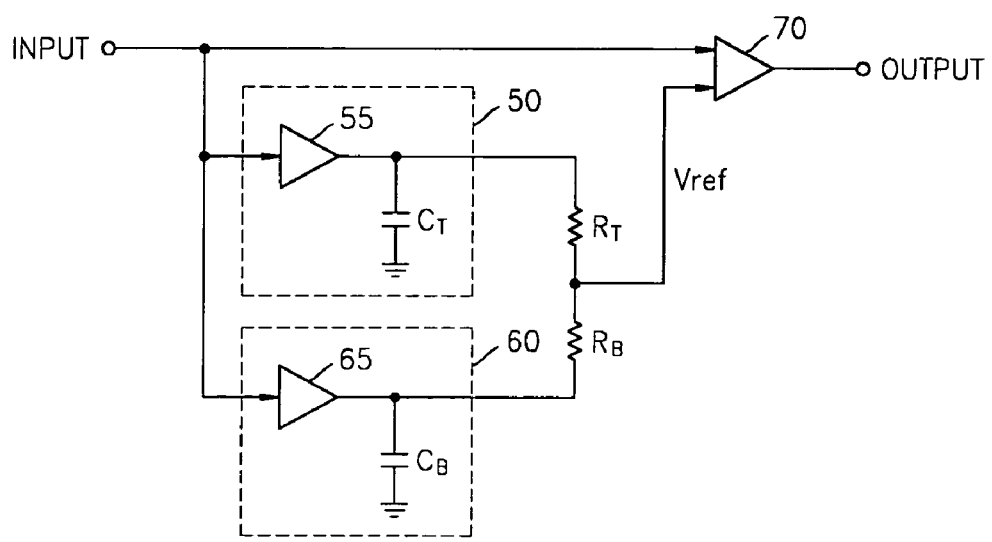
FIG. 2 is a block diagram of a conventional burst mode optical receiver in the form of a feed-forward scheme.
Figure 3:
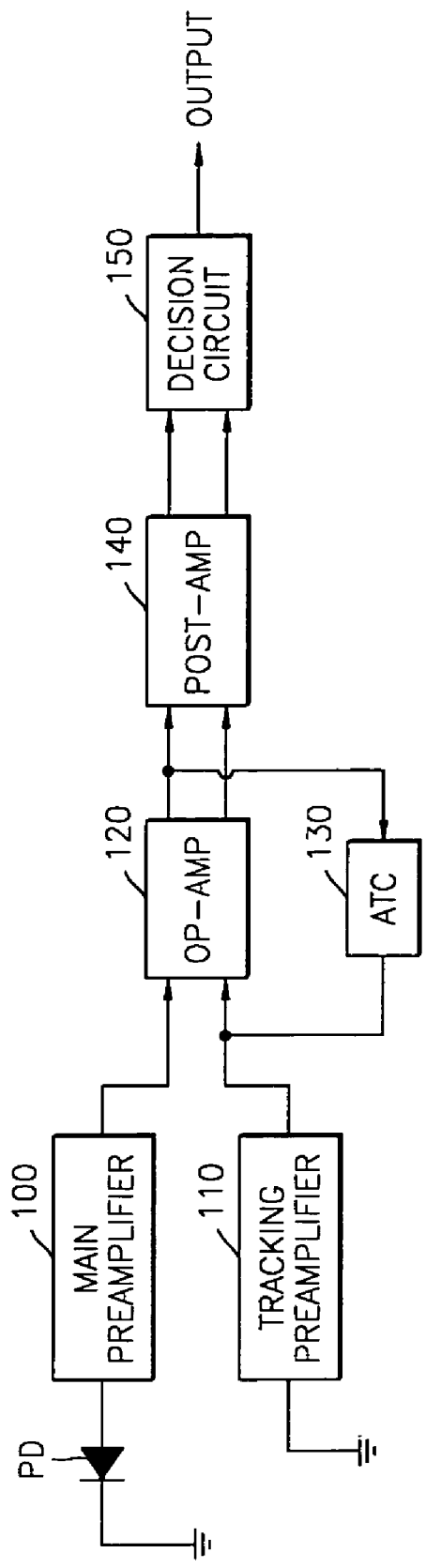
FIG. 3 is a block diagram of a conventional burst mode optical receiver in the form of a feed-back scheme.
Figure 4:
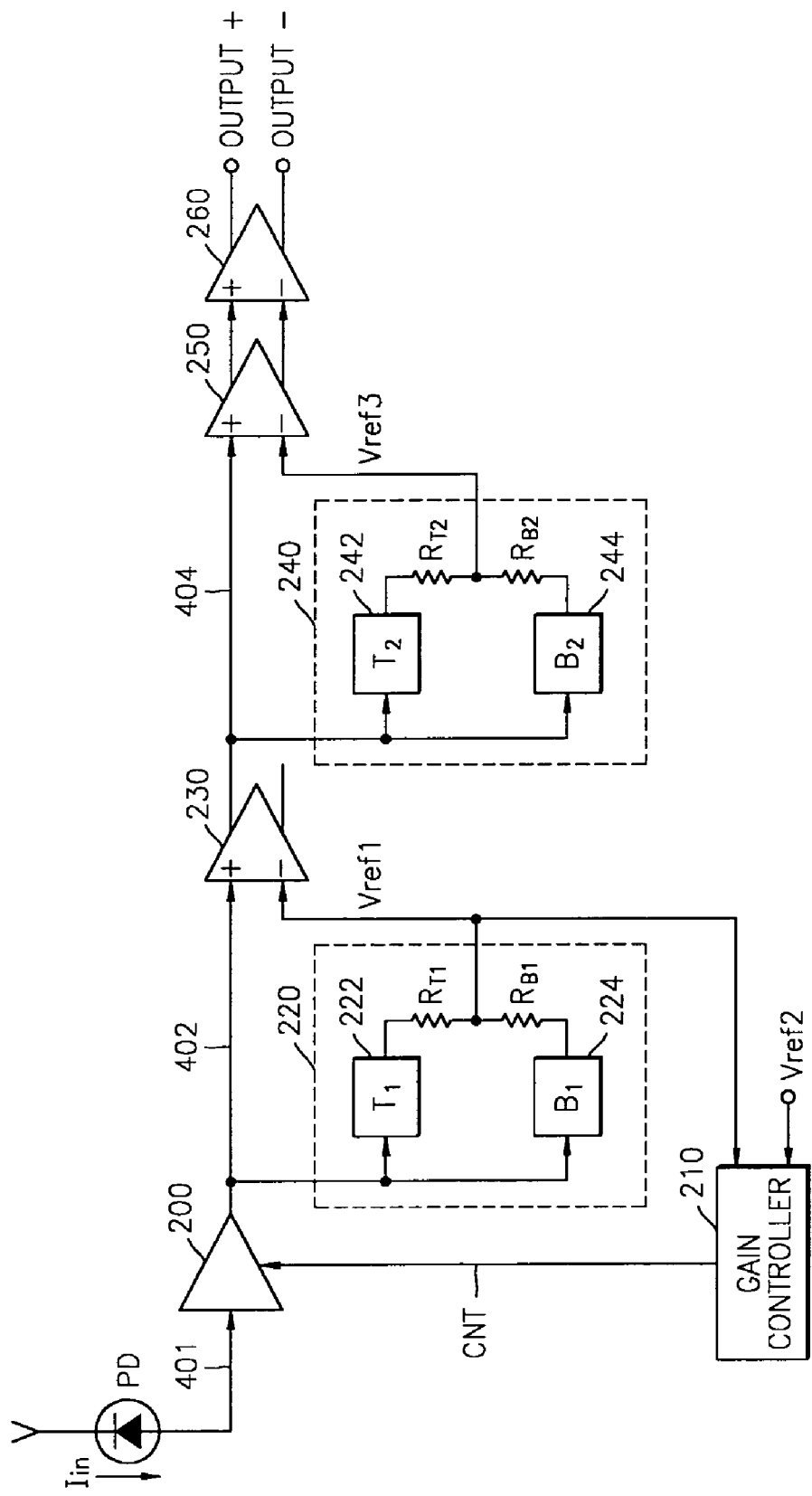
FIG. 4 is a block diagram of a burst mode optical receiver according an embodiment of the present invention.

FIG. 4 is a block diagram of a burst mode optical receiver according an embodiment of the present invention. Referring to FIG. 4, the burst mode optical receiver includes a photodiode PD, a pre-amplifier 200, a gain controller 210, a first peak detector 220, a second peak detector 240, a first limiting amplifier 230, a second limiting amplifier 250, and a buffer 260.

The photodiode PD receives an optical signal from an external optical transmitter and converts the received optical signal into a current signal.

The pre-amplifier 200 converts the current signal into a voltage signal, amplifies the voltage signal with a gain provided by the gain controller 210, and outputs an amplified signal 402.

The first peak detector 220 detects a top peak voltage and a bottom peak voltage of the amplified signal 402 and outputs an average value of the top peak voltage and the bottom peak voltage as a first reference voltage Vref1 to a negative terminal of the first limiting amplifier 230. As shown in FIG. 4, the first peak detector 220 includes a top peak detector 222 that detects the top peak voltage of the amplified signal 402, a bottom peak detector 224 that detects the bottom peak voltage of the amplifier signal 402, and resistors $R_{T1}$ and $R_{B1}$ that are used to obtain the average value of the top peak voltage and the bottom peak voltage.

The first limiting amplifier 230 receives the amplified signal 402 and the first reference voltage Vref1 and amplifies the difference therebetween.

The gain controller 210 compares the first reference voltage Vref1 and a second reference voltage Vref2 and controls a trans-impedance of the pre-amplifier 200 based on the comparison result so as to control the gain of the pre-amplifier 200.

The second peak detector 240 detects a top peak voltage and a bottom peak voltage of a limitedly amplified signal 404 output from the first limiting amplifier 230 and outputs an average value of the detected top peak voltage and the detected bottom peak voltage as a third reference voltage Vref3 to a negative terminal of the second limiting amplifier 250. The second peak detector 240 includes a top peak detector 242 that detects the top peak voltage of the limitedly amplified signal 404, a bottom peak detector 244 that detects the bottom peak voltage of the limitedly amplified signal 404, and resistors $R_{T2}$ and $R_{B2}$ that are used to obtain the average value of the detected top peak voltage and bottom peak voltage.

The second limiting amplifier 250 receives the limitedly amplified signal 404 and the third reference voltage Vref3 and amplifies the difference therebetween. An amplified signal output from the second limiting amplifier 250 is buffered and output by the buffer 260. As such, the output of the buffer 260 is a signal amplified to a predetermined level, e.g., an LVPECL level, regardless of the amplitude of an input optical signal of the burst mode optical receiver.

Figure 5A:
FIGS. 5A through 5D illustrate waveforms of signals generated by the burst mode optical receiver of FIG. 4.
Figure 5B:
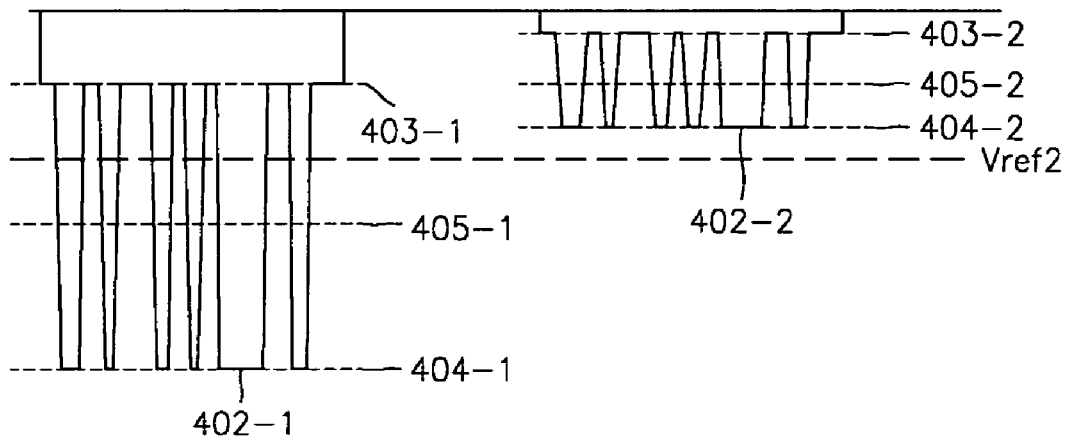
Figure 5C:
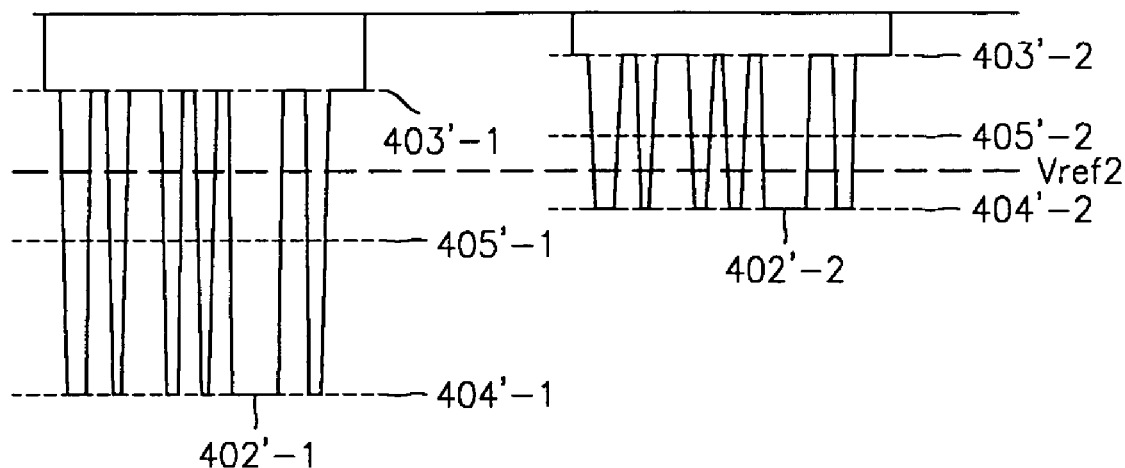
Figure 5D:
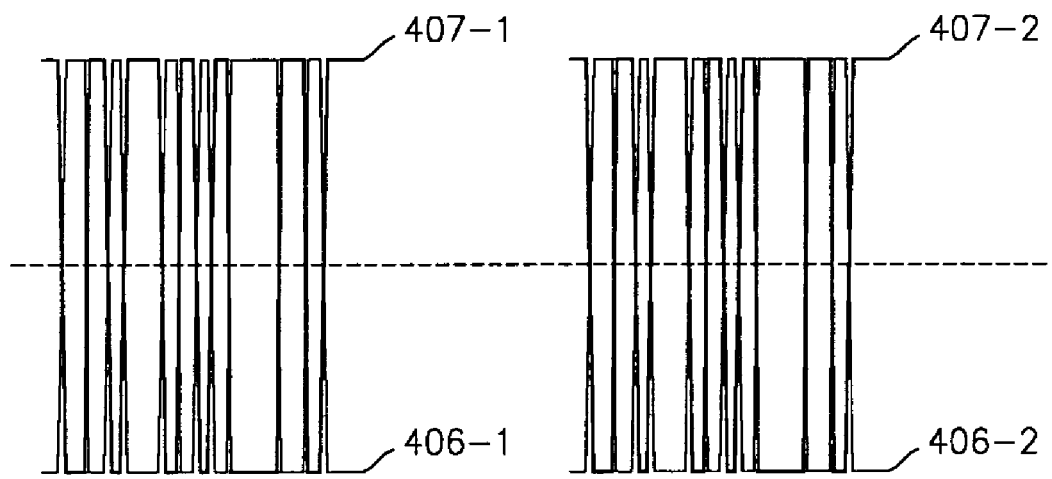

FIGS. 5A through 5D illustrate waveforms of major signals generated by the burst mode optical receiver of FIG. 4. FIG. 5A illustrates the waveform of an input signal of the pre-amplifier 200. FIG. 5B illustrates the waveform of an output signal of the pre-amplifier 200 when the gain controller 210 does not operate. FIG. 5C illustrates the waveform of an output signal of the pre-amplifier 200 when the gain controller 210 operates. FIG. 5D illustrates the waveform of an output signal of the buffer 260.

Hereinafter, the operation of the burst mode optical receiver according to the present invention will be described with reference to FIGS. 4 and 5.

In a passive optical network (PON), when optical packets received from a plurality of optical network units are converted into current signals by the photodiode PD, the amplitudes of respective current signals are different as indicated by waveforms 401-1 and 401-2 of FIG. 5A, and burst characteristics, i.e., continuous sets of 0s and 1s are exhibited. After the current signals pass through the pre-amplifier 200 of FIG. 4 and are output as indicated by waveforms 402-1 and 402-2 of FIG. 5B, in the first peak detector 220, the top peak detector 222 detects the top peak voltage of an input signal and the bottom peak detector 224 detects the bottom peak voltage of an input signal operate, and thus the average value of the detected top peak voltage and the detected bottom peak voltage, i.e., waveforms 405-1 and 405-2, is output as the first reference voltage Vref1. It is assumed that the current signal indicated by the waveform 401-1 has a large amplitude that meets maximum overload of the burst mode optical receiver, and the current signal indicated by the waveform 401-2 has a small amplitude that meets the receiving sensitivity of the burst mode optical receiver. In this case, it is difficult to accurately detect top peak voltage and bottom peak voltage of the current signal indicated by the waveform 401-2. As a result, the accuracy of the average value indicated by the waveform 405-2 may decrease. Thus, if the trans-impedance of the pre-amplifier 200 increases so as to accurately detect the top peak voltage and the bottom peak voltage of the current signal indicated by the waveform 401-2, a bandwidth of the burst mode optical receiver decreases. In addition, a current signal of a large amplitude, indicated by the waveform 401-1, may be amplified too much, and thus, some transistors used in the burst mode optical receiver operate in a linear operating region, which decreases an operating speed of the burst mode optical receiver and causes waveform distortion. Therefore, the burst mode optical receiver requires a pre-amplifier that operates with low trans-impedance when a signal of a large amplitude is input while operating with high trans-impedance when a signal of a small amplitude is input, such that a low noise characteristic of the burst mode optical receiver is not affected by the operation of the pre-amplifier. The operation of the pre-amplifier can be carried out using the gain controller 210.

When receiving the first reference voltage Vref1 output from the first peak detector 220, the gain controller 210 compares the first reference voltage Vref1 with the second reference voltage Verf2 of a predetermined level. For instance, when a signal of a large amplitude, indicated by the waveform 401-1 of FIG. 5A, is input, the level of the first reference voltage Vref1 is lower than that of the second reference voltage Vref2 as shown in FIG. 5B. In this case, the gain controller 210 outputs a control signal CNT to the pre-amplifier 200 to direct the operation of the pre-amplifier 200 to operate with low trans-impedance. Thus, a gain of the pre-amplifier 200 decreases. In contrast, when a signal of a small amplitude, indicated by the waveform 401-2 of FIG. 5A, is input, the level of the first reference voltage Vref1 is higher than that of the second reference voltage Vref2. In this case, the gain controller 210 outputs the control CNT to the pre-amplifier 200 to direct the operation of the pre-amplifier 200 to operate with high trans-impedance. Thus, the gain of the pre-amplifier 200 increases.

Using this control operation of the gain controller 210, when a signal of a small amplitude, indicated by the waveform 401-2 of FIG. 5A is input, it is amplified to a signal of an amplitude, indicated by the waveform 402'-2 of FIG. 5C. As shown in FIG. 5C, when the gain controller 210 operates, an input signal of a small amplitude, indicated by the waveform 401-2 of FIG. 5A, is amplified to a signal of an amplitude greater than when the gain controller 210 does not operate as shown in FIG. 5B.

The output signal of the pre-amplifier 200 of FIG. 5C passes through the second peak detector 240 whose configuration is the same as that of the first peak detector 220, the second limiting amplifier 250, and the buffer 260, and then is output as a signal of FIG. 5D.

As such, using the control operation of the gain controller 210, both the signal of a large amplitude indicated by the waveform 401-1 and the signal of a small amplitude indicated by the waveform 401-2 are amplified to signals of a predetermined amplitude.

In the present invention, the gain controller 210 of FIG. 4 sets only one reference voltage, i.e., the second reference voltage Vref2, to compare with the first reference voltage Vref1 and controls the trans-impedance of the pre-amplifier 200 in two ways based on the comparison result. However, it is possible to set n reference voltages (where n is greater than 2), compare n reference voltages with the first reference voltage Vref1, and control the trans-impedance of the pre-amplifier 200 based on the comparison result at (n+1) walls, thereby more accurately controlling the gain of the pre-amplifier 200 according to the amplitude of an input optical signal.

Figure 6:
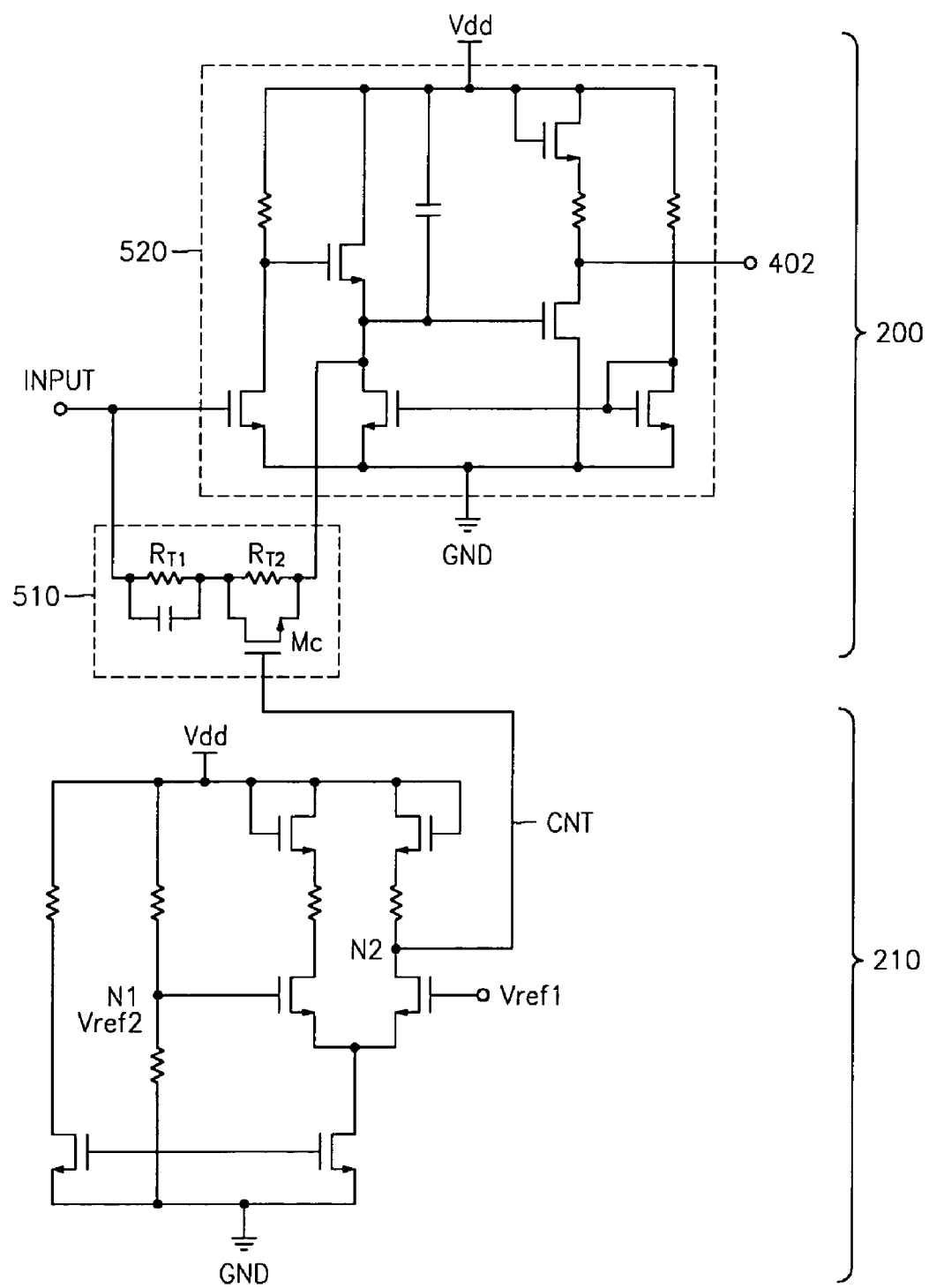
FIG. 6 illustrates a pre-amplifier 200 and a gain controller 210 of FIG. 4, according to another embodiment of the present invention.

FIG. 6 illustrates the pre-amplifier 200 and gain controller 210 of FIG. 4 according to anther embodiment of the present invention.

Referring to FIG. 6, the gain controller 210 compares the second reference voltage Vref2 generated at a node N1 with the first reference voltage Vref1 output from the first peak detector 220 of FIG. 4. If the level of the first reference voltage Vref1 is lower than that of the second reference voltage Vref2, the control signal CNT of a first level that is high enough to turn on a transistor Mc is output to an output node N2 of the gain controller 210. On the other hand, if the level of the first reference voltage Vref1 is higher than that of the second reference voltage Vref2, the control signal CNT of a second level that turns off the transistor Mc is output to the output node N2 of the gain controller 210.

The pre-amplifier 200 includes an impedance control unit 510 and an amplifying unit 520. The impedance control unit 510 sets trans-impedance of the pre-amplifier 200 to a value corresponding to a first impedance or a second impedance in response to the control signal CNT. The amplifying unit 520 converts an input current signal INPUT to a voltage signal and amplifies the voltage signal with a gain corresponding to the trans-impedance controlled by the impedance control unit 510. If the control signal CNT of the first level is generated from the gain controller 210, the transistor Mc of the impedance control unit 510 is turned on, and thus the trans-impedance of the pre-amplifier 200 decreases to $R_{T1}$. On the other hand, if the control signal CNT of the second level is generated by the gain controller 210, the transistor Mc of the impedance control unit 510 is turned off, and thus the trans-impedance of the pre-amplifier 200 increases to $(R_{T1}+R_{T2})$. As a result, the pre-amplifier 200 can amplify the input current signal INPUT with a gain corresponding to the trans-impedance $(R_{T1}+R_{T2})$.

As described above, the burst mode optical receiver according to the present invention can automatically control a gain of a pre-amplifier according to the amplitude of an input optical signal using an output signal bf a first peak detector. In other words, when the input optical signal has a small amplitude that meets the receiving sensitivity of the burst mode optical receiver, the gain of the pre-amplifier automatically increases, thereby improving the receiving sensitivity of the burst mode optical receiver.

While the present invention has been particularly shown and described with reference to exemplary embodiments thereof, it will be understood by those of ordinary skill in the art that various changes in form and details may be made therein without departing from the spirit and scope of the invention as defined by the appended claims and their equivalents.

What is claimed is:

1. A burst mode optical receiver comprising:
   a photodiode, which receives an optical signal and converts the optical signal into a current signal;
   a pre-amplifier, which converts the current signal into a voltage signal, amplifies the voltage signal with a gain according to a control signal, and outputs an amplified signal, the pre-amplifier comprising an impedance control unit which controls an impedance of the pre-amplifier in response to the control signal and an amplifying unit which converts the current signal into the voltage signal and amplifies the voltage signal with a gain corresponding to said impedance controlled by the impedance control unit;
   a first peak detector, which detects a top peak voltage and a bottom peak voltage of the amplified signal and outputs an average value of the detected top peak voltage and the detected bottom peak voltage as a first reference voltage;
   the gain controller, which compares the first reference voltage with a comparison voltage and outputs the control signal which controls a gain of the pre-amplifier according to the comparison result, the control signal having a first level when the first reference voltage is lower than the comparison voltage, and the control signal having a second level when the first reference voltage is higher than the comparison voltage;
   a first limiting amplifier, which receives the amplified signal and the first reference voltage and amplifies a difference between the amplified signal and the first reference voltage; and
   a buffer, which buffers a limitedly amplified signal from the first limiting amplifier,
   wherein, when the control signal of the first level is generated from the gain controller, a transistor of the impedance control unit is turned on to decrease a trans-impedance of the pre-amplifier and, when a control signal of the second level is generated from the gain controller, the transistor is turned off to increase the trans-impedance of the pre-amplifier.

2. The burst mode optical receiver of claim 1 further comprising:
   a second peak detector, which detects a top peak voltage and a bottom peak voltage of the limitedly amplified signal and outputs an average value of the detected top peak voltage and the detected bottom peak voltage as a second reference voltage; and
   a second limiting amplifier, which receives the limitedly amplified signal and the second reference voltage, amplifies the difference between the limitedly amplified signal and the second reference voltage, and outputs an amplified signal to the buffer.

3. The burst mode optical receiver of claim 1, wherein the impedance control circuit comprises serially-connected resistors, one of which is parallelly connected with the transistor.

* * * * *